United States Patent [19]
Cain et al.

[11] 3,980,110
[45] Sept. 14, 1976

[54] FLOW METERING DEVICE

[75] Inventors: Earl S. Cain, Portola Valley; Jerome A. Carlson, Woodside; James G. Crummett, San Jose; George E. Goodrich, San Carlos, all of Calif.

[73] Assignee: Tribotech Incorporated, Redwood City, Calif.

[22] Filed: Jan. 29, 1975

[21] Appl. No.: 545,126

[52] U.S. Cl. ............................. 141/351; 141/363; 141/367; 184/26; 184/105 R; 222/215; 222/564; 251/342
[51] Int. Cl.² ...................... B65B 3/10; F16N 5/00; F01M 11/04
[58] Field of Search .................. 141/18, 94, 95, 114, 141/284, 311, 312, 324, 351, 352, 363–366, 379, 367, 383–386; 184/7 E, 14, 26, 39, 105 R; 222/215, 325, 386.5, 564; 251/149.1, 149.5, 342

[56] References Cited
UNITED STATES PATENTS
2,588,026  3/1952  Martin .................................. 184/14
2,840,185  6/1958  Norgren .......................... 222/564 X Primary Examiner—Richard E. Aegerter
Assistant Examiner—Frederick R. Schmidt
Attorney, Agent, or Firm—Flehr, Hohbach, Test

[57] ABSTRACT

A device for metering the flow of a fluid, such as a lubricating medium, at a controlled rate. The fluid is stored within a reservoir having a resiliently expandable wall which maintains the fluid under pressure. A transparent cover is provided for visual observation of the wall to indicate the volume of fluid in the reservoir. The pressurized fluid is directed from the reservoir through an elongate flow passage having a cross-sectional area which is sized in relation to the passage length to establish a predetermined rate of fluid flow. In one embodiment the device is automatically energized upon threading engagement with the opening of a structure to be lubricated, and can then be disengaged and stored in a partially full condition. In another embodiment the flow rate can be readily varied by changing the length of a circular flow passage, or the device can be energized or de-energized, by rotating the transparent cover. In stll another embodiment a variable flow rate device is provided which can be automatically energized or deenergized by threading engagement or disengagement with an opening.

29 Claims, 10 Drawing Figures

FLOW METERING DEVICE

BACKGROUND OF THE INVENTION

This invention generally relates to flow metering devices, and in particular relates to metering devices such as lubricators which supply a continuous flow of lubricating medium to mechanical structures, e.g. bearings or other moving parts of a machine.

Various devices have been heretofore provided for supplying a lubricating medium to the moving parts of a machine. Many machines employ a grease box or chamber into which grease is injected at periodic intervals by means of a grease gun or the like. In many applications it is not satisfactory to provide periodic lubrication and therefore continuous feed type lubricators have been developed. These lubricators employ a reservoir of lubricating medium such as oil with provision being made to feed the oil through a fitting into the machine. In certain of these lubricators the lubricant is propelled by means of a compressed gas, a resilient envelope, or a spring loaded piston. However, such prior art lubricators have a number of limitations and shortcomings. For example, it has been difficult to precisely establish a pre-determined lubricant flow rate and the prior art devices have not been capable of selectively varying the flow rate. Such prior art lubricators have also been relatively complicated in design, are expensive to manufacture and are relatively large and cumbersome. Moreover, lubricators have heretofore not been storable over a long period of time with the lubricant reservoir under pressure, nor have they been readily adaptable to being dismounted, stored for a period of time and then rapidly remounted and energized. Thus there is a requirement for a new and improved lubricator which will obviate the foregoing limitations and shortcomings of existing devices.

OBJECTS AND SUMMARY OF THE INVENTION

It is a general object of the invention to provide a flow metering device such as a lubricator which is adapted to meter a fluid at a precisely controlled flow rate, and which will ensure a positive fluid supply at all times.

Another object is to provide a lubricator of the type described which is relatively simple in design, inexpensive in cost to manufacture and which can be rapidly inserted into a structure for immediate operation.

Another object is to provide a lubricator of the type described which can be stored in a shut-off condition with the lubricant under pressure within a reservoir, and which is thereafter fully energized upon installation.

Another object is to provide a lubricator of the type described which is adapted for relatively simple adjustment of the lubricant flow rate over a relatively large range, and which can be easily turned on and off without removing the lubricator.

Another object is to provide a lubricator of the type described which provides for easy visual indication of the volume of lubricant which remains within the reservoir.

Another object is to provide a lubricator of the type described which is adapted to be readily filled with the lubricant, with the lubricant thereafter being storable under pressure within the lubricator.

The invention provides a resiliently expandable wall which maintains a reservoir of fluid, such as a lubricating medium, under pressure within a reservoir. The fluid is metered from the reservoir through an elongate flow passage at a controlled rate. In one embodiment a fitting is formed with elastic threads which engage internal threads of a different pitch formed in an opening of the structure to be lubricated. An inner sleeve of the fitting occludes the inlet of the flow passage to shut off fluid flow for storage purposes. When the device is threadably engaged with the structure opening, the threaded portion of the fitting expands and moves the sleeve away from the passage inlet for permitting flow from the reservoir through the passage. In one embodiment the flow passage comprises one or more axial grooves formed about the outer surface of an elongate plug, and in another embodiment the flow passage comprises one or more axial bores formed internally of an elongate plug. In other embodiments variable flow rate devices are provided, one of which includes elastic threads which expand upon engagement for energizing the device. In the variable flow rate devices the flow passages are defined by an annular groove in the rim of a plate which is mounted for rotation relative to the annular portion of an elastomeric member. An inlet opening directs pressurized fluid from a reservoir into the groove, and an outlet opening is formed in the elastomeric member to direct fluid from the groove into an annular chamber from which the fluid is directed through a passage leading to the structure to be lubricated. Rotation of the rim of the plate relative to the elastomeric member selectively varies the circular distance between the openings whereby the length of the flow passage is varied for controlling the rate of flow through the groove.

The foregoing and additional objects and features of the invention will appear from the following description in which the preferred embodiments have been set forth in detail in conjunction with the accompanying drawings.

DESCRIPTION OF THE PREFERRED EMBODIMENTS

Figure 1:
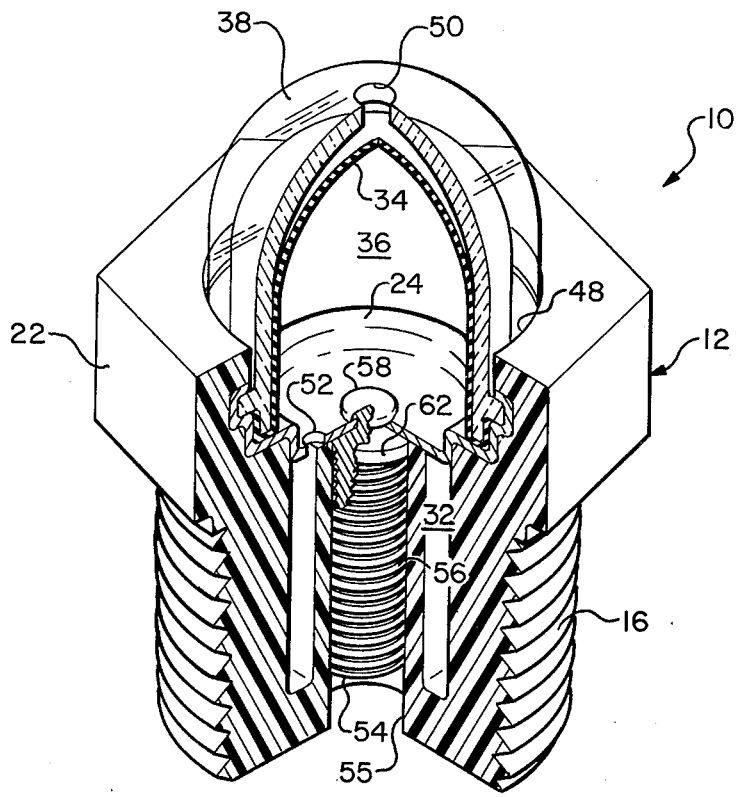
FIG. 1 is a perspective view, partially cut-away, of the lubricator of one embodiment of the invention.

In the drawings FIG. 1 indicates generally at 10 a fluid flow metering device comprising a lubricator constructed in accordance with the invention. Lubricator 10 will be described as adapted for metering a fluid lubricating medium such as oil, although it is understood that the invention will find application with other types of viscous fluids, granular viscous solids, or other lubricants such as grease and the like.

Lubricator 10 includes a resilient base member or fitting 12 formed of a suitable elastomeric material such as a synthetic polymer, e.g., polyurethane. A cylindrical lower end 14 of the fitting is formed with the external male threads 16 having a given thread pitch. Fitting 12 is adapted to be threadably engaged within the internally threaded opening of the structure 18 which is to be lubricated. This threading engagement both activates the lubricator and provides sealing to preclude loss of lubricating medium past the threaded connection, thereby ensuring its delivery to the point of use. The female threads 20 of the opening are formed with a thread pitch which is relatively coarse with respect to the male threads 16 of the fitting so that engagement of the disparate pitched threads causes axial distortion and elongation of the threaded portion of the fitting. The invention also contemplates a reversal of elements with coarse pitch male threads engaging fine pitch female threads, or any similar arrangement in which the fitting is elastically stretched for controlling fluid flow in the manner to be described.

In one specific application of the invention, as an example, the male threads 16 are formed with a 0.416 inch nominal diameter and a pitch of 36 threads per inch while the female threads 20 are fomed with a pitch of 27 threads per inch so that threading engagement with structure 20 causes the lower end of the fitting to resiliently elongate.

The upper end of fitting 10 is formed with an hexagonal shoulder 22 for purposes of applying a wrench or other tool to screw the fitting into and out of the opening. A rigid plate 24 is formed with a series of annular rims which are seated within internal circular grooves formed in shoulder 22. The innermost rim 26 of the plate projects into an annular groove 28 formed concentrically of lower end 14 of the fitting. The inner wall of groove 28 is defined by a cylindrical sleeve 30 which is integral with and extends upwardly from the lower end wall of the fitting. The lower surface of plate 24 cooperates with groove 28 to define a chamber 32.

A resilient expandable wall 34 is mounted above plate 24 to define a lubricant reservoir or chamber 36. The resilient wall is disc-shaped and is fabricated from a suitable elastomeric material such as Buna N rubber. Wall 34 is secured to plate 24 by means of a dome-shaped cover 38, which is formed of a suitable transparent material such as clear polycarbonate. The outer periphery of the wall is tightly captured between the lower circular rim 40 of the transparent cover and corner 42 of the plate.

Cover 38 is secured to fitting 12 by means of a circular shoulder 44 which is captured in outer rim 46 of plate 24, which in turn is captured within a circular groove formed within shoulder 22 of the fitting. The cover projects upwardly through a central opening 48 of the shoulder, and a small diameter opening 50 is formed at the upper end of the cover to permit transfer of air into and from the cover so that resilient wall 34 can freely expand and contract. The transparency of the cover facilitates visual observation of the extent of expansion of wall 34 and this in turn provides an indication of the volume of lubricant within reservoir 36.

Figure 2:
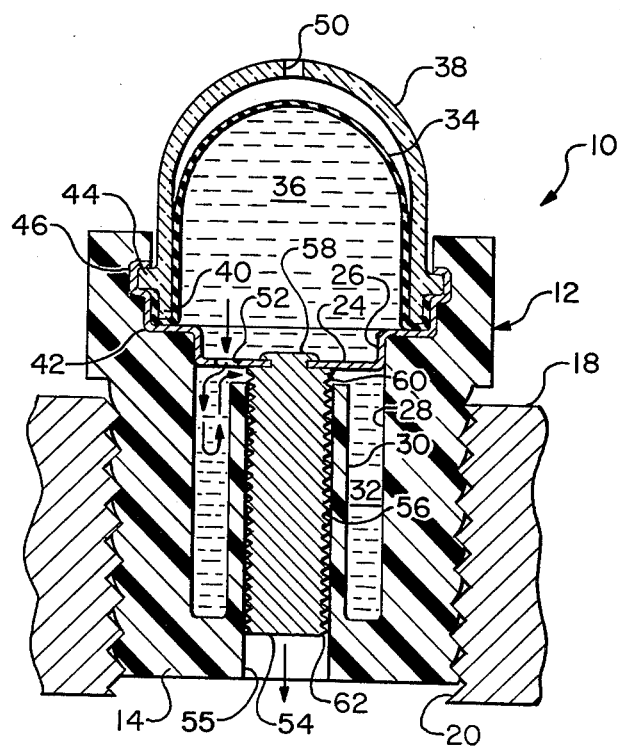
FIG. 2 is a fragmentary axial section view of the lubricator of FIG. 1.

The charge of lubricant within the reservoir is pressurized by the elastic expansion of wall 34. One or more openings 52 are formed in plate 24 to direct the pressurized lubricant from the reservoir into chamber 32, as illustrated in FIG. 2.

Means forming an elongate flow passage is provided to meter the lubricant at a controlled rate from chamber 32 into the opening of structure 18. In the embodiment of FIG. 1 and 2 the flow passage means includes an elongate plug 54 slidably mounted in close-fitting contact within a central bore 55 of sleeve 30. The plug is formed about its outer surface with a helical groove 56. Preferably groove 56 comprises a V-shaped thread having a cross-sectional area which is sized in relation to the thread length so that a pre-determined flow rate is established for metering a fluid with a given viscosity under a given pressure within the reservoir. The use of a threaded member provides a long flow passage so that a relatively large cross-sectional flow area can be employed for metering inasmuch as flow rate is inversely proportional to passage length and a more complex proportional relationship to cross-sectional area. As a result the danger of plugging of the threads due to dirt or other foreign objects is minimized. In one specific application of the invention, as an example, plug 54 is formed with 90° Vee threads having a nominal diameter of 0.094 inch and a pitch of 150 threads per inch.

The reduced diameter upper end 58 of plug 54 projects through a central opening formed in plate 24 and this upper end is staked to the plate by swaging the edge of the plug over the upper surface of the plate. The plug threads 56 cooperate wtih the surface of sleeve bore 55 to form a single, continuous helical flow passage having an inlet 60 at the upper end of the threads and an outlet 62 at the lower end. The upper end of the threads terminate at a relatively short distance below the lower surface of plate 24. With lubricator 10 disengaged from structure 18 the resilient fitting 14 assumes a relaxed state such that the upper end of inner sleeve 30 is positioned about the unthreaded portion 62 of plug 54, as best illustrated in FIG. 1. In this state the thread inlet 60 is occluded such that lubricant within chamber 32 cannot communicate into the flow passage.

In its relaxed state lubricator 10 can be rapidly filled by directing the lubricant under pressure upwardly through sleeve bore 55 and into threads 56, with the pressure of the lubricant radially expanding the distal end of resilient inner sleeve 30 to a sufficient diameter that the upper end of the sleeve expands across and exposes plate opening 52. This permits the lubricant to discharge through the opening directly into reservoir 36.

It will be realized that the use of a helical groove or threads about plug 54 provides a relatively compact flow passageway which achieves precise metering of the flow rate. The flow from the lubricator is a function of reservoir pressure, as well as the cross-sectional area and length of the flow passage. The fluid pressure within reservoir 36 for a lubricant such as oil is preferably in the range of five to fifteen psi as generated by the elastic forces of wall 34. Because this reservoir pressure is constant over substantially the entire deflection range of the wall, the metering flow rate is constant for a particular flow passage design. A varied flow rate can be established by varying the designed cross-sectional area and length of the threads, or by fabricating wall 34 from a material having greater or lesser resiliency.

In the operation of the embodiment of FIGS. 1 and 2, lubricator 10 is first charged with a lubricating medium such as oil by directing the oil under pressure upwardly through bore 55 into outlet end 62 of the threads. The pressurized oil within the threads expands the distal end of sleeve 30 radially outwardly until the sleeve clears plate opening 52 permitting the oil to discharge into reservoir 36 and expand wall 34 upwardly to the position indicated in FIG. 1. Air within cover 38 is expelled through opening 50 as the wall expands. When the reservoir is filled with the desired volume of oil, the oil supply is disengaged so that sleeve 30 contracts back around plug 54 and occludes inlet end 60 of the threads, as illustrated in FIG. 1. The lubricator can then be stored in this condition for an indefinite period of time with the oil trapped within reservoir 36 and chamber 32 ready for immediate use.

Lubricator 10 is energized automatically when threaded into the opening of the structure to be lubricated. As the fine pitch threads 16 of resilient fitting 14 engage the coarser pitch female threads 20 the lower end of the fitting elongates so that inner sleeve 30 is displaced axially away from plate 24. When the upper end of the sleeve displaces sufficient to expose inlet end 60 of the threads pressurized oil is directed from chamber 32 into the threads. The oil flows through the threads at a controlled rate and discharges through outlet end 62 and into the structure. The oil is continuously metered at this rate as the volume of reservoir 36 diminishes and resilient wall 34 contracts. The amount of oil which remains can be gauged by visually observing the size of wall 34 through the transparent cover. When the oil in the reservoir is depleted lubricator 10 is unscrewed, discarded and replaced by another fully charged lubricator. Alternatively, the lubricator can be unscrewed while reservoir 36 is partially filled, stored for a period of time in this condition and then reinstalled with the lubricator again immediately becoming energized to meter oil. It will be observed that contamination of the lubricant supply is prevented because the lubricator can be stored in its shut-off condition prior to usage, with the lubricator only being energized when installed. Moreover, relubrication of the device is not required inasmuch as the lubricator is designed for easy replacement by a complete fully charge unit. This eliminates the problems of over or under supply and/or contamination which could arise with relubrication.

Figure 3:
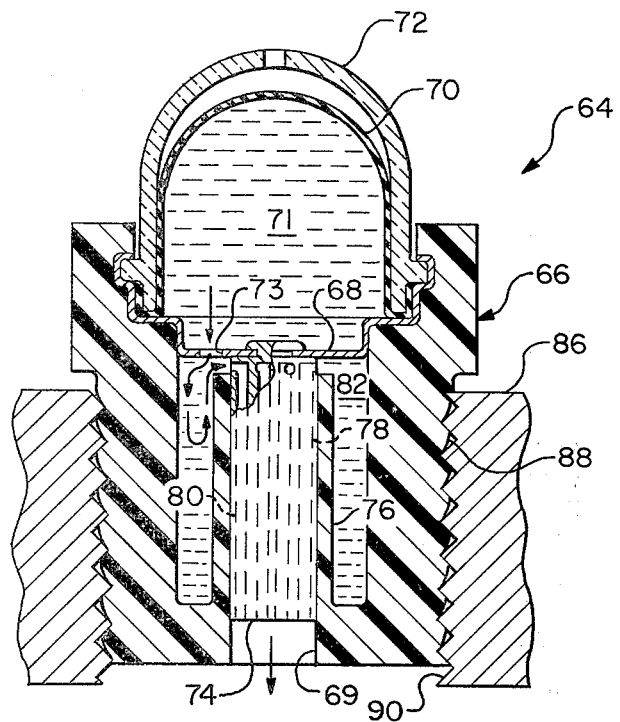
FIG. 3 is a fragmentary axial section view similar to FIG. 2 of another embodiment of the invention.

FIG. 3 illustrates another embodiment of the invention providing a lubricator 64 having a modified flow passage for metering the lubricant. Lubricator 64 includes an externally threaded fitting 66 mounting a plate 68, resiliently expandable wall 70 and transparent cover 72, all of which are similar in construction and function to the corresponding elements described in connection with the embodiment of FIG. 1. Wall 70 is adapted to expand to form a reservoir 71 which opens downwardly through one or more openings 73 formed in plate 68.

The means defining a flow passage in lubricator 64 includes an elongate plug 74 mounted at its upper end to a central opening of plate 68, with the plug extending axially through a central opening 69 of an inner sleeve 76 which is formed integrally with fitting 66. One or more elongate, axially extending bores 78, 80 are fomred internally of plug 74. Radially extending openings 82 are formed through the upper sides of the plug and these openings extend into the upper ends of respective bores 78, 80 to serve as inlets into the bores. The outlets of the bores open downwardly through the lower end of the plug.

FIG. 3 illustrates the energized condition of lubricator at which it is mounted in the threaded opening of structure 86 which is to lubricated. The male threads 88 of the lubricator are of a finer pitch than the coarse pitch female threads 90 so that sleeve 76 is elongated when the threads are in engagement.

In operation of the embodiment of FIG. 3 lubricator 64 is charged with a volume of oil or other fluid in a manner similar to that described for embodiment of FIG. 1. Thus, oil under pressure is directed upwardly through the central opening 69 of inner sleeve 76 which expands radially outwardly sufficient to direct oil through plate opening 73 to fill reservoir 71. Thereafter the upper end of sleeve 76 contracts and occludes the inlets 82 of axial bores 78, 80 so that the lubricator can be stored. The lubricator is immediately energized upon being screwed into the opening. As the fine pitch male threads 88 engage the coarser pitch female male threads 88 the elastic threaded portion of fitting 66 elongates and displaces the inner sleeve downwardly to expose inlets 82. The pressurized oil from the reservoir then flows at a pre-determined rate through these bores and into the structure to be lubricated. When it is observed through transparent cover 72 that the reservoir supply is depleted lubricator 64 is unscrewed and replaced by a fully charged one. Alternatively, a partially depleted lubricator may be unscrewed, stored for any desired length of time and then reinstalled.

Figure 4:
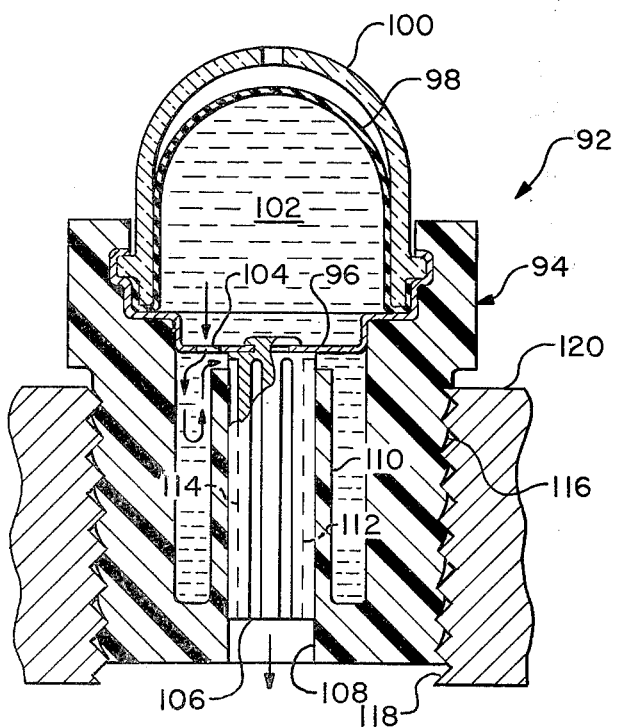
FIG. 4 is a fragmentary axial section view similar to FIG. 2 of another embodiment of the invention.

FIG. 4 illustrates another embodiment of the invention providing a lubricator 92 incorporating another modified flow passage for metering the lubricant. Lubricator 92 includes an externally threaded fitting 94 mouting a plate 96, resiliently expandable wall 98 and transparent dome 100 which are similar in construction and function to the corresponding elements described for the embodiment of FIG. 1. Wall 98 defines a reservoir 102 which opens downwardly through one or more openings 104 formed in plate 96.

The flow passage means in lubricator 92 includes an elongate circular plug 106 mounted at its upper end to a central opening of plate 96, with the plug extending axially through a central opening 108 of an inner sleeve 110 which is formed integrally with fitting 94. One or more elongate axially extending grooves 112, 114 are formed about the outer periphery of plug 106, and these grooves cooperate with the inner surface of sleeve opening 108 to define elongate flow passages having upper inlet ends spaced below plate 96 and outlet ends at the bottom of the plug.

In the energized condition of lubricator 92 as shown in FIG. 4 the fine pitch male threads 116 of fitting 94 and engaged with the coarser pitch female threads 118 of a structure 120 which is to be lubricated. This threaded engagement causes sleeve 110 to elongate.

The use and operation of lubricator 92 is similar to that described for the embodiment of FIG. 1. Reservoir 102 of the lubricator is charged by injecting oil under pressure upwardly through sleeve opening 108. The sleeve expands radially so that oil flow directly through opening 104 into the reservoir as resilient wall 98 expands. Thereafter the upper end of sleeve 110 contracts and occludes the inlet ends of grooves 112, 114 to trap the oil within the reservoir such that it can be stored for an indefinite period of time. The lubricator is energized by screwing its fine pitch threads 116 into the coarser pitch female threads 118. This causes the threaded portion of fitting 94 to elongate and move inner sleeve 110 downwardly exposing the inlets of the grooves 112, 114 so that oil is metered from reservoir 102 at a controlled rate. When the supply of oil in the reservoir is depleted, as observed through transparent cover 100, the lubricator can be unscrewed and replaced by another fully charged one. Alternatively, the lubricator can be unscrewed with the reservoir partially depleted, stored in this condition and then reinstalled in fully energized condition.

FIGS. 5 through 9 illustrate another embodiment of the invention comprising a lubricator 122 which provides for a variable metering flow rate. Lubricator 122 inlcudes an elongate fitting 124 which is externally threaded at its lower end 126 for engagement with internal threads of an opening in the structure which is to be lubricated. The upper portion of the fitting is formed with a hexagonal surface 128 for applying a wrench or other tool to mount and dismount the lubricator. A center bore 130 is formed axially of the fitting as a passageway for the fluid, such as a lubricant.

An annular cup 132 is mounted about the upper end of fitting 124. Cup 132 is formed with an integral downwardly projecting U-shaped portion 134, together with an integral outer rim 136 which serves as a hand hold for manually screwing the lubricator into and out of the structure to be lubricated.

A disc-shaped resilient membrane 138 formed of a suitable elastomeric material such as Buna N rubber is mounted across the inner bottom of cup 132. The outer peripherial margin 140 of the disc-shaped membrane is fixedly secured by means of a mounting ring 142 fitted within the inner surface of rim 136. The ring 142 is formed with an inwardly directed L-shaped shoulder 144 which is jammed in tight-fitting engagement against the outer margin 140 of the dish-shaped membrane.

A resevoir assembly 146 is mounted above cup 132 for rotation about the longitudinal axis of the lubricator. Assembly 146 includes a dome-shaped transparent cover 148 formed of a suitable material such as clear polycarbonate. An outwardly projecting annular shoulder 150 formed integrally with the cover is mounted below the intrusive annulus 152 of rim 136. A plate 154 formed of a suitable material such as aluminum is mounted below cover 148. Plate 154 includes an outer rim 156 mounted about shoulder 150, with an intrusive annulus 158 of the rim being seated flush in a groove formed about the upper surface of shoulder 150. The upper surface of annulus 158 thereby provides a bearing surface to permit relative rotation between reservoir assembly 146 and cup 132.

Plate 154 further includes an intermediate upwardly projecting U-shaped portion 160 as well as a downwardly facing annular rim 162. Rim 162 is positioned when assembled so as to press against and distort downwardly an annular portion 163 of disc-shaped membrane 138. The annular contact between the upper surface of this membrane and the lower surface of rim 162 is thereby free for relative rotation, while at the same time the elastic forces of the stretched membrane create an annular fluid seal preventing fluid leakage from between the interface between the membrane and edges of rim 162.

A resilient expandable wall 164 comprising a disc-shaped membrane is mounted within transparent cover 148 above plate 154 to define a fluid containing chamber or reservoir 166. Preferably wall 164 is formed of an elastomeric material such as Buna N rubber.

Wall 164 is fixedly secured to assembly 146 by means of a mounting ring 168 which is captured between cover shoulder 150 and outer rim 156 of plate 154. The outer periphery 170 of the wall is in tight fitting engagement between an L-shaped inner portion 172 of the mounting ring and the U-shaped portion 160 of plate 154. A downwardly extending annular portion 174 of cover 148 urges the outer margin of wall 164 downwardly below the plane of the inner flat portion of plate 154 such that the wall is held in a stretched condition across the plate when reservoir 166 is empty. When the reservoir is filled with fluid wall 164 expands upwardly to the position indicated in the drawings, with the elastic forces of the wall serving to pressurize the fluid. An opening 175 is formed at the top of cover 148 to permit entry and exit of air so that the wall is free to expand and contract.

Figure 5:
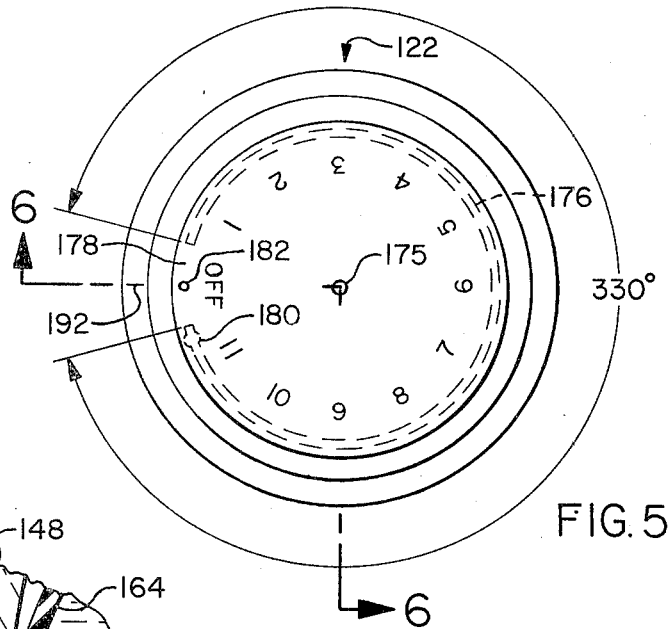
FIG. 5 is a top plan view of the lubricator of another embodiment of the invention.

Flow passage means is provided for metering fluid at a selected flow rate from the reservoir into the structure to be lubricated. The flow passage means includes an annular channel or groove 176 formed in an arc of less than 360° about annular rim 162 of plate 154. Groove 162 is positioned concave with respect to the facing annular portion 163 of membrane 138 so that a flow passage of a generally triangular cross-sectional area is formed between these two elements. As best illustrated in FIG. 5 groove 176 extends about the longitudinal axis of the lubricator through an arc of substantially 330° such that a non-grooved or flat portion 178 of rim 162, encompassing substantially 30° of arc, is established between the opposite ends of the groove. The maximum flow passage length could be varied, as desired, by varying the arc length of the groove, or by varying the groove diameter.

An inlet opening 180 is formed in plate rim 162 through one end of groove 176 direct lubricant from reservoir 166 into the groove. An outlet opening 182 is formed in membrane 138 at a radius from the longitudinal axis which is substantially equal to the radius of groove 176. Outlet opening 182 serves to direct lubricant from the groove into a chamber 184 which is formed between the lower surface of membrane 138 and U-shaped portion 134 of cup 132. One or more openings 186 are formed in the upwardly extending portion of membrane 138 to direct lubricant from chamber 184 into a chamber 188 which is formed between the upper surface of the membrane and plate 154. A central opening 190 is formed in the membrane to direct lubricant from chamber 188 along bore 130 of the fitting.

As illustrated in FIG. 5 suitable indicia or a scribe mark 192 of formed on the upper surface of cup annulus 152 at a position in radial register with outlet opening 182. A plurality of metering flow rate indicia are embossed or printed about the outer margin of cover 148. In the illustrated embodiment the indicia comprises the numerals 1 through 11 located at equal spacing along groove 176 to indicate cardinal flow rate settings, with the indicia "OFF" located on the cover in radial register with the flat portion 178 of plate 154.

Manual rotation of reservoir assembly 146 carries selected indicia into register with scribe mark 192 for establishing the desired operating mode of the lubricator, with an infinitely variable setting being provided between full off and maximum flow rates. With the indicia "OFF" in register with scribe mark 192, as shown in FIG. 5, flat portion 178 of the plate is in position over membrane outlet 182 which is thereby occluded to prevent flow from the reservoir. The reservoir assembly is rotated by manually gripping and turning transparent cover 148 while cup 132 is stationary.

Figure 8:
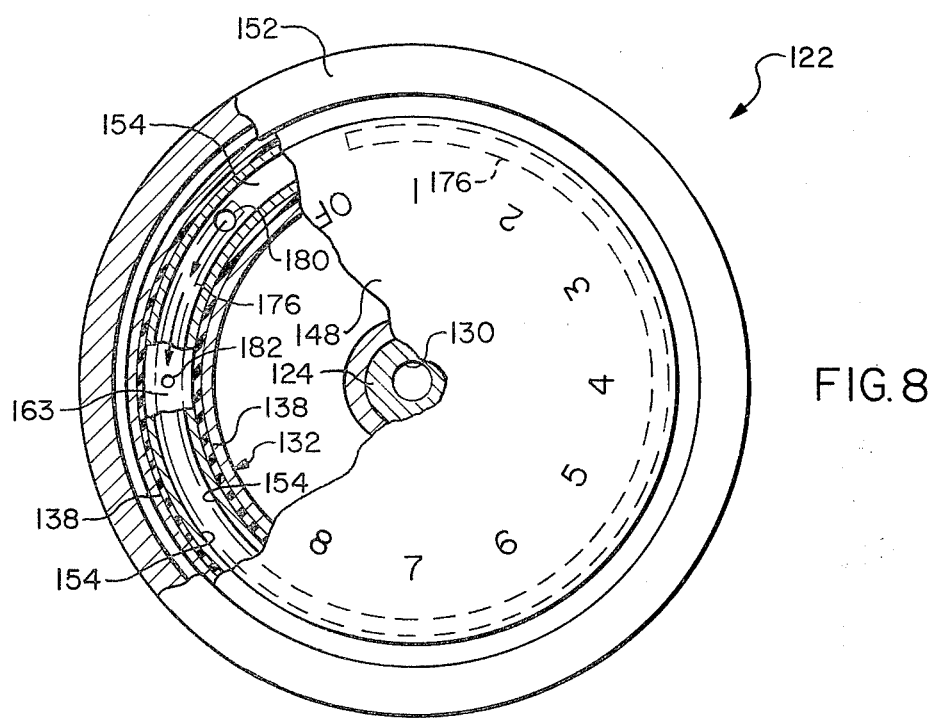
FIG. 8 is a fragmentary cross-section view taken along the line 8—8 of FIG. 6 showing the elements in one operative position.
Figure 9:
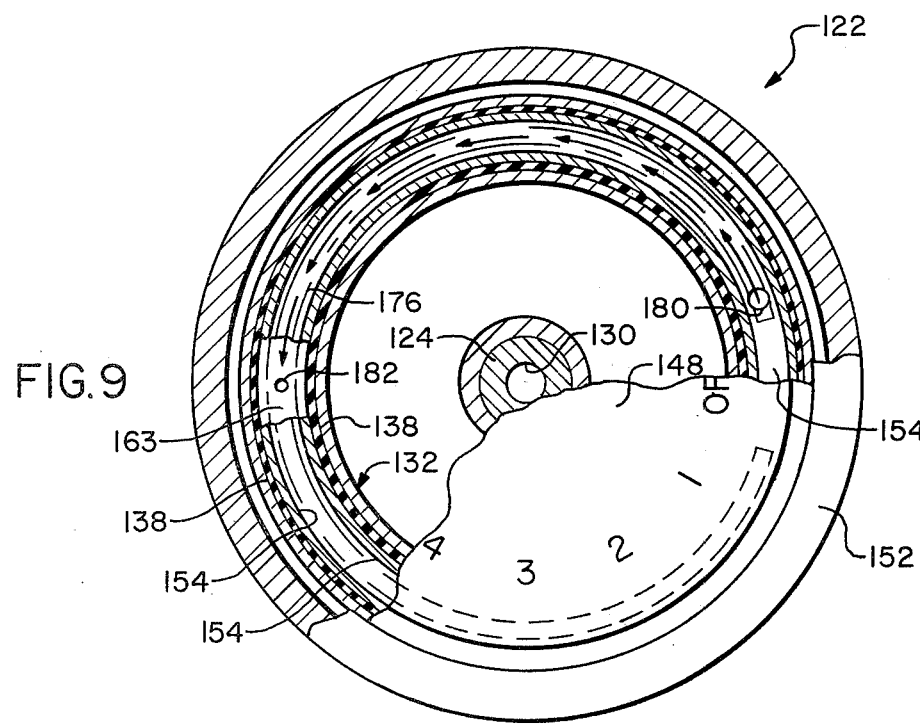
FIG. 9 is a view similar to FIG. 8 showing the elements in another operative position.

To establish a relatively fast rate of lubricant flow, and therefore a short lubrication time, reservoir assembly 146 is rotated to a position such that there is a relatively short distance along the path of the groove between plate inlet 176 and membrane outlet 182. For a given lubricant pressure within reservoir 166, and a given pre-established cross-sectional area of the groove, the shorter flow path with result in less flow resistance and therefore a greater flow rate. An example of a relatively high flow rate is illustrated in FIG. 8 where the reservoir assembly is shown as a position at which inlet 180 is spaced through an arc of 40° along groove 176 from membrane outlet 182. For a relatively slow lubricant flow rate, and therefore a long lubrication time, the reservoir assembly is rotated to a position at which inlet 180 is spaced through a relatively long path along the groove from the membrane outlet. This is illustrated in FIG. 9 where the reservoir assembly is shown as turned 180° from the "OFF" position of FIG. 5 such that inlet 180 is positioned at an arc of 160° from outlet 182.

Figure 7:
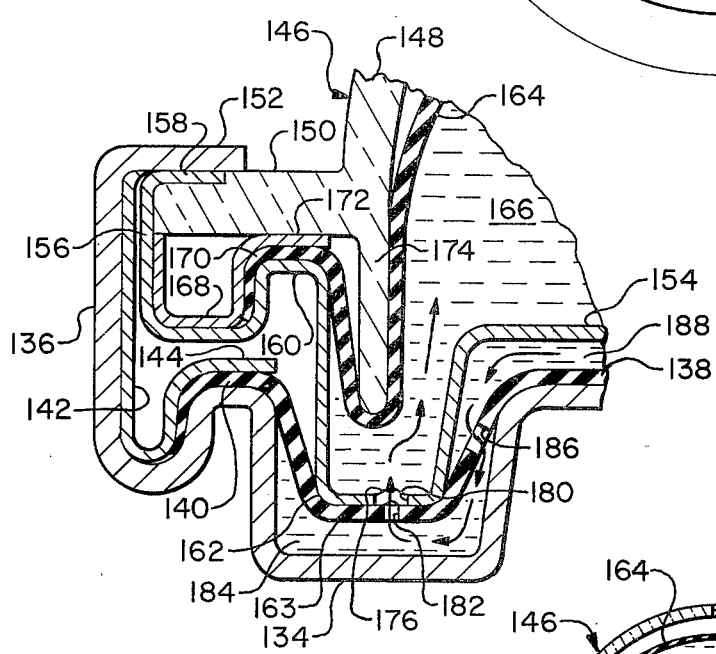
FIG. 7 is a fragmentary cross-section view, to a greatly enlarged scale, of a portion of the lubricator shown in FIG. 6.
Figure 6:
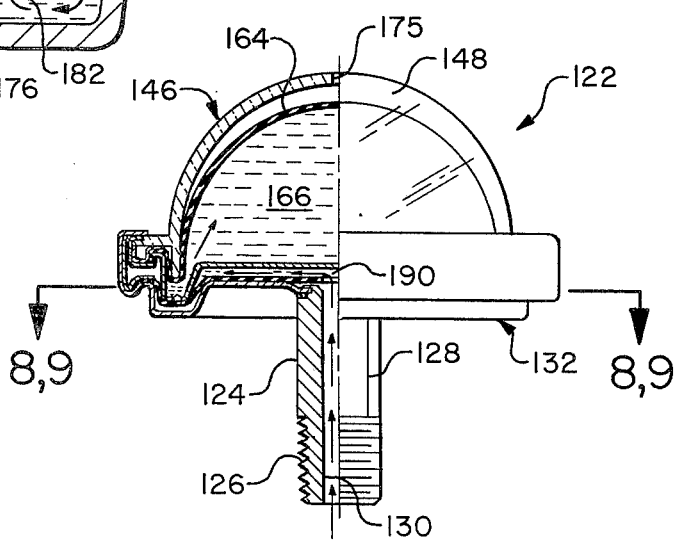
FIG. 6 is an axial section view taken along the lines 6—6 of FIG. 5.

In operation, lubricator 122 is rapidly charged with a volume of lubricant by first turning reservoir assembly 146 to a position at which plate inlet 180 is in vertical register with membrane outlet 182, as illustrated in FIGS. 6 and 7. Pressurized lubricant is then forced in the direction of the arrows through bore 130 of fitting 124, through center opening 190 into chamber 188, through membrane opening 186 into chamber 184, and through the aligned outlet and inlet openings 182 and 180 into reservoir 166. As resilient wall 164 expands and fills with lubricant air within cover 148 is exhausted through its opening 175. With the reservoir filled to the desired extent assembly 146 is rotated to its "OFF" position with plate flat portion 154 occluding outlet 182. The lubricator can then be stored in its charge condition for an indefinite period of time.

When ready for use fitting 124 of the lubricator is screwed into the opening of the structure to be lubricated. Reservoir assembly 146 is then turned until the appropriate indicia for the selected flow rate is in register with scribe mark 192. The elastic forces of wall 164 pressurize the contained lubricant which is forced through plate inlet 180, along groove 176, through membrane outlet 182 and into chamber 184 from which it flows into chamber 188 for discharge through bore 130. When it is observed through transparent cover 148 that wall 164 has collapsed downwardly indicating that the reservoir is depleted, the lubricator can be unscrewed and replaced with another fully charged one. When it is desired to remove a partially depleted lubricator reservoir assembly 146 is turned back to its "OFF" position and the lubricator is unscrewed. The lubricator can then be stored for any period of time and reinstalled fully energized by again turning the reservoir assembly to a selected operative position.

Figure 10:
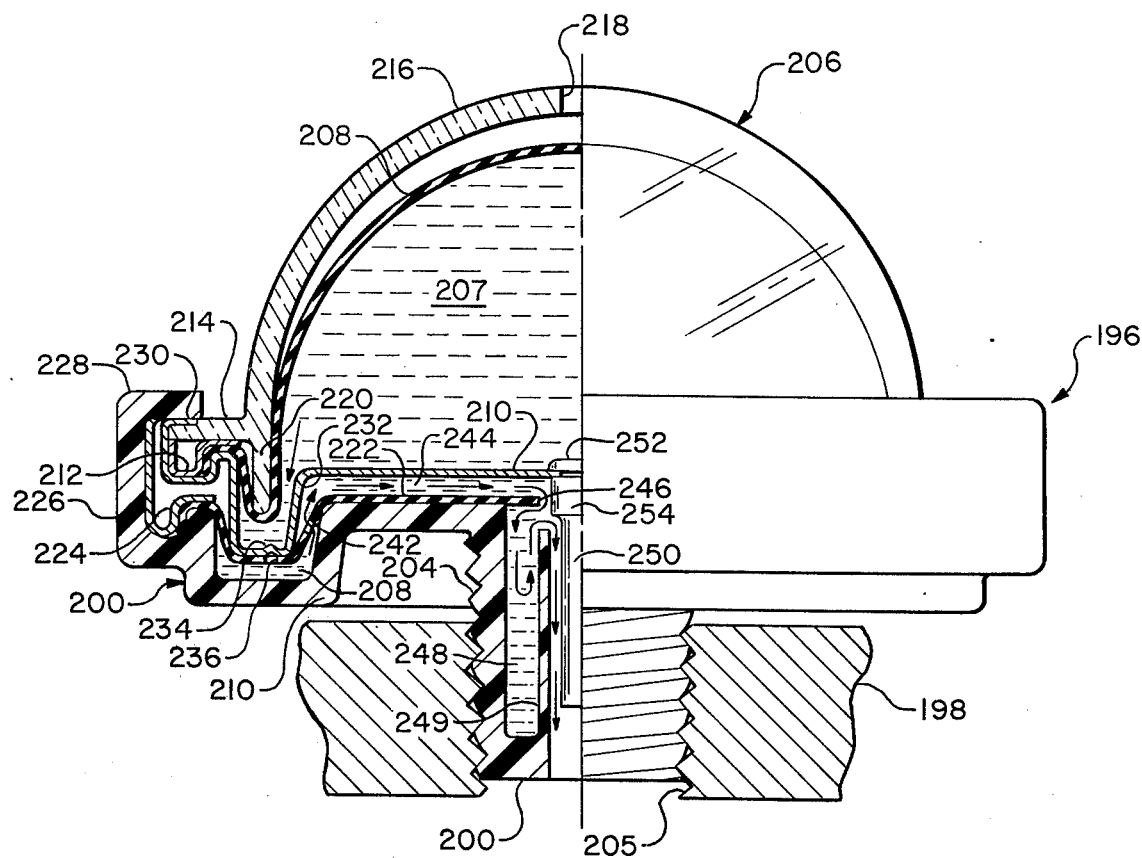
FIG. 10 is a fragmentary cross-sectional view of another embodiment of the invention.

FIG. 10 illustrates another embodiment of the invention providing a variable flow metering device 196 which double shut off modes for use with a structure 198 into which the fluid is to be metered. Structure 198 can be a component of a bearing or other machine where the invention is used for metering a lubricating medium such as oil.

Device 196 includes a one-piece molded resilient housing 200 formed of a suitable elastomeric material such as a synthetic polymer, e.g., polyurethane. A hollow cylindrical fitting 202 formed integrally with the housing extends along the longitudinal axis of the device. External threads 204 are formed about the fitting for engagement with internal threads 205 in an opening of structure 198. The internal threads are formed with a thread pitch which is relatively coarse with respect to external threads 204 so that the fitting stretches and elongates axially when screwed into structure 198. The invention also contemplates an arrangement in which coarse pitch external threads engage fine pitch internal threads causing axial distortion of the fitting, or any other arrangement in which the fitting is elastically stretched or compressed for controlling fluid flow in the manner to be described.

A reservoir assembly 206 is mounted above housing 200 for confining under pressure a charge of fluid, such as a lubricating medium, within reservoir 207. The reservoir assembly includes a resiliently expandable wall or membrane 208 which is mounted above a rigid circular plate 210. Membrane 208 is disc-shaped and is fabricated from a suitable elastomeric material such as Buna N rubber. The outer peripheral margin of the membrane is fixedly secured to an outer rim of plate 210 by means of a mounting ring 212. This mounting ring is captured in place by means of the annular shoulder 214 of a dome-shaped cover 216. The cover is formed of a suitable transparent material such as clear polycarbonate to facilitate observation of the size of membrane 208 for gauging the volume of the fluid charge. A central opening 218 is formed in the cover for transfer of air to permit the membrane to freely expand and contract. A downwardly extending annular rim 220 of the cover urges the outer margin of the membrane downwardly below the plane of plate 210 so that the membrane is normally stretched across the plate when the reservoir is empty.

A disc-shaped resilient membrane 222 formed of a suitable elastomeric material such as Buna N rubber is mounted within housing 200. The outer periphery of membrane 222 is affixed to the housing by means of a mounting ring 224 which is fitted within an outer rim 226 of the housing. Rim 226 also serves as a hand hold for purposes of screwing the device into and out of structure 198. An intrusive annulus 228 of the rim extends across the inwardly projecting plate edge 230 which is seated flush in a groove formed about the upper surface of cover shoulder 124. The lower surface of annulus 228 provides a bearing surface to permit relative rotation between reservoir assembly 206 and the housing.

A downwardly projecting U-shaped rim 232 of plate 210 presses against and distorts downwardly an annular portion of membrane 222. The annular area of contact between the membrane and rim 232 is thereby free for relative rotation while at the same time the elastic forces in the membrane create an annular fluid seal preventing fluid leakage from the interface between the membrane and edges of rim 232.

Means forming a flow passage is provided for metering fluid at a selected flow rate from reservoir 207 into structure 198. The flow passage means includes an annular channel or groove 234 formed in an arc of less than 360° about plate rim 232. Groove 234 is concave with respect to the annular portion of membrane 222 so that a generally triangular cross-sectional flow passage is created. The non-grooved or flat portion between the opposite ends of the groove preferably encompasses substantially 30° of arc.

An inlet opening, not shown, is formed in plate rim 232 through one end of groove 234 to direct fluid from the reservoir into the groove, and an outlet opening 236 is formed in membrane 222 in radial register with the groove. Fluid flowing from the reservoir through the groove and the outlet opening is directed into a chamber 238 formed between membrane 222 and U-shaped portion 240 of the housing. One or more openings 242 are formed in the upwardly extending portion of membrane 222 to direct the fluid upwardly into a chamber 244 which is formed between membrane 222 and plate 210. A circular opening 246 is formed centrally of this membrane to direct fluid downwardly into an annular chamber 248 which surrounds a hollow cylindrical sleeve 249 formed integrally with the distal end of fitting 200.

Suitable indicia or a scribe mark, not shown, is formed on the upper surface of housing annulus 228 at a position in radial register with outlet opening 236, and a plurality of metering flow rate indicia, not shown, are embossed or printed about the outer margin of cover 216 in the manner described for the embodiment of FIGS. 5–9. As described therein manual rotation of reservoir assembly 206 carries selected indicia into register with the scribe mark for varying the circular distance along groove 234 between the inlet and outlet openings for establishing the desired flow rate setting. The reservoir assembly can also be rotated to a position at which outlet 236 is in register with the flat portion of plate 210 to shut off flow from the reservoir. For filling the reservoir the inlet and outlet openings are moved into register so that fluid can flow directly from chamber 238 through the openings and into the reservoir.

A flow control member comprising an elongate plug 250 is mounted at its upper end 252 through an opening in plate 210. The plug extends co-axially within cylindrical sleeve 249 and is formed at its upper end with an enlarged shoulder 254 which has a diameter commensurate with the inner diameter of the sleeve to permit the latter to move axially in close-fitting sealing relationship about the shoulder. The length of sleeve 249 is dimensioned so that, when fitting 200 is in its relaxed state disengaged from structure 198, the sleeve is positioned upwardly with its distal end about the surface of shoulder 254 to shut off flow therebetween. This provides for a flow shut-off mode which is in addition to that in which the reservoir assembly is turned so that the flat portion of plate 210 is in register with outlet opening 236. When the fitting is in threading engagement within the opening of structure 198 the fitting elongates axially and displaces the sleeve downwardly so that its distal end clears the lower edge of shoulder 254 to permit fluid to communicate into chamber 248 and the annular space between the sleeve and plug, from which it thereafter flows into structure 198.

The use and operation of metering device 196 is similar to that described for the embodiment of FIGS. 5–9. The device is charged with fluid by turning reservoir assembly 206 until the plate inlet opening is in register with outlet opening 236, afterwhich which the fluid is directed under pressure upwardly within inner sleeve 249. With fitting 200 in its relaxed state disengaged from the threaded opening, the pressurized fluid expands the distal end of sleeve 249 radially away from plug shoulder 254 to permit fluid flow directly through central opening 246 into chamber 244, through opening 242 into chamber 238, and through the aligned inlet and outlet openings into reservoir 207. Membrane 208 resiliently expands as the reservoir is filled to the desired volume, as observed through the transparent cover. Assembly 206 is then turned to its "OFF" position and the fluid supply disconnected. Device 196 can now be stored uninstalled for an indefinite period of time with the reservoir fully charged. In the uninstalled state the provision of the double flow shut-off modes permits the device to be stored with fluid completely filling the chambers 238, 244 and 248 which lie downstream of the flow metering groove. In addition the device can be stored while uninstalled with the reservoir assembly turned to either the "OFF" or an operative position.

For installation fitting 200 is screwed into threads 205, and this elongates the fitting to displace sleeve 249 away from plug shoulder 254. The device can remain installed in this state for an indefinite period of time before being energized by turning reservoir assembly 206 to the desired flow rate setting at which outlet 236 is in register with plate groove 234. At this point lubricant flow from the device is achieved in a relatively short length of time inasmuch as the fluid within annular chamber 248 can immediately flow into the inner diameter of sleeve 249. Flow energization time is shorter because it is not necessary to wait for lubricant to migrate from reservoir 207 through the annular groove and downstream chambers in order to reach the point of lubrication. In addition, the connection between the elastic threads of fitting 200 and the threads 205 provides a seal which precludes loss of lubricant past the threaded connection, thereby insuring lubricant delivery to the point of use. Device 196 can also be disengaged from structure 198 with reservoir 207 partially depleted, stored for an indefinite period and then reinstalled to immediately resume flow metering.

While the foregoing embodiments are at present considered to be preferred it is understood that numerous variations and modifications may be made therin by those skilled in the art and it is intended to cover in the appended claims all such variations and modifications as fall within the true spirit and scope of the invention.

What is claimed is:

1. In a device for metering the flow of a viscous medium into a structure with an opening having internal threads of a given pitch, the combination of means forming a chamber for containing a charge of the medium under pressure, means forming at least one elongate flow passage having an inlet end positioned to receive said medium from said chamber and an outlet end positioned to direct said medium to said structure, said flow passage having a given cross-sectional area and having a length which is sized in relation to said cross-sectional area and in relation to the viscosity of the pressurized medium whereby the medium flows from the chamber through the passage at a predetermined rate, an elastomeric base member formed with external threads having a pitch which differs from said given pitch with the external threads of the base member being engageable with the internal threads of the opening whereby the difference in pitch of the threads causes a change in axial dimension of the base member, and flow shut-off means mounted for movement with the end of the base member with the flow shutoff means being positioned to occlude said inlet end of the flow passage for shutting off flow therethrough when the base member is out of engagement with the opening, and with the shut-off means being moved by the base member away from the inlet of the flow passage to permit flow therethrough when the base member is threadably engaged with said structure opening.

2. A device as in claim 1 in which the flow passage extends along a helical path formed about a longitudinal axis of the lubricator.

3. A device as in claim 2 in which the means forming the flow passage includes an externally threaded elongate member which extends along said axis, together with a cylindrical sleeve mounted about said elongate member with the inner wall of the sleeve being in juxtaposed cooperating relationship with the threads of the elongate member to define said helical passage.

4. A device as in claim 1 in which the means forming the flow passage includes at least one elongate passage extending along a path generally longitudinally of the device.

5. A device as in claim 4 in which the means forming the flow passage includes an elongate member extending along a longitudinal axis of the device, means forming at least one groove in the outer surface of the elongate member with the groove extending generally in the direction of said axis, and means forming a wall about the elongate member with the inner surface of the wall being in juxtaposed cooperating relationship with the groove to form said flow passage.

6. A device as in claim 5 in which the elongate member comprises a cylinder and a plurality of said grooves are formed about the outer surface of the cylinder, and the means forming the wall comprises a cylindrical sleeve mounted about the outer surface of the cylinder.

7. A device as in claim 4 in which the means forming the flow passage includes an elongate member extending along a longitudinal axis of the device and means forming at least one bore internally of the elongate member.

8. A device as in claim 1 in which the means forming the flow passage includes an elongate member extending along a longitudinal axis of the device with the inlet end of the flow passage being at the outer periphery of a first end of the elongate member, and said shut-off means includes means forming an elongate wall about the outer surface of the elongate member with said wall being mounted at its one end for movement with the distal end of said base member and with the opposite end of the wall extending across the inlet end of the flow passage when the base member is out of engagement with the structure opening and whereby elongation of the base member upon threading engagement thereof with the opening moves said opposite end of the wall away from said inlet end.

9. A lubricator as in claim 1 in which the pitch of the external threads of the base member is less than said given pitch of the internal threads.

10. In a device for metering the flow of a viscous medium into a structure, the combination of means forming a chamber containing the medium under pressure, means forming at least one elongate flow passage including a first member having an inlet opening position offset froma longitudinal axis of the device with the inlet opening communicating with the medium within the chamber, a second member having an outlet opening positioned offset from said axis, means forming a channel in said first or second member, said channel extending along an arc about said axis whereby the medium flows from the chamber through the inlet opening and along the channel and discharges through the outlet opening, said channel having a given cross-sectional area and having a length which is sized in relation to said cross-sectional area and in relation to the viscosity of the pressurized medium whereby the medium flows from the chamber through the channel at a predetermined rate, means mounting the first member for relative rotation about said axis with respect to said second member for selectively varying the separation distance along said channel between said inlet and outlet openings whereby the length of said flow passage is selectively varied for controlling the rate of flow of the medium into said structure, and means for opening and closing sid flow passage.

11. A device as in claim 10 in which at least an annular portion of each of the first and second members are in juxtaposed relationship, said channel comprises a groove formed in said first member with the groove being concave with respect to the second member, said inlet opening is formed in the first member and projects through the groove, and the outlet opening is formed in the second member.

12. A device as in claim 10 in which said channel is formed in said first member and extends about an arc of less than 360° whereby opposite ends of the channel are separated by a substantially flat portion of the first member, and one of said openings is formed in the member and projects through the channel with the other of said openings being formed in the second member, and said first member is mounted for rotation with respect to the second member to selectively move said flat portion into juxtaposed relationship with the other opening in the second member to shut off flow through the flow passage.

13. A device as in claim 10 in which the first member includes an annular rim portion, said channel comprises a groove formed along said rim portion, said second member comprises an elastomeric membrane having an annular portion stretched in fluid-sealing relationship across the rim portion of the first member, said inlet opening is formed in the first member projecting through the groove, and said outlet opening is formed in the annular portion of the second member.

14. A device as in claim 13 which includes a cup-shaped member mounted about the second member and forming an annular chamber therewith for receiving medium which discharges through the outlet opening, a fitting carried by the cup-shaped member with the fitting being engagable with said structure, and means forming a passageway for directing the medium from said annular chamber through said fitting and into the structure.

15. A device as in claim 14 which is mountable in an opening having internal threads of a given pitch, a flow control member carried by the fitting and having an end which is positioned to move to open and close said passageway, said fitting being formed of an elastomeric material and having external threads of a different pitch than said given pitch whereby threading engagement of the external threads into the internal threads causes movement of the control member to open said passageway, with said control member closing said passageway when the external threads are out of engagement with the internal threads.

16. A device as in claim 10 in which the chamber means includes a resiliently expandable wall, and a dome-shaped cover formed of a transparent material and mounted about said expandable wall to permit visual observation of the extent of the expansion of the wall for indicating the volume of medium contained therein.

17. In a device for metering the flow of viscous medium into a structure having an opening formed with internal threads of a given pitch, the combination of an annular body having an internal wall, means forming external threads about a first end of the body with the threads being formed with a pitch which is less than said given pitch, means forming an annular sleeve radially spaced from the wall to define a chamber therewith, with the proximal end of the sleeve being carried by said first end of the annular body, said annular body being formed of a resilient material which elongates upon threading engagement between said threads, means forming a reservoir for containing said medium under pressure, said reservoir being in medium communication with the chamber, means forming at least one flow passage interior of said sleeve having an inlet communication with the chamber and an outlet communicating with the structure for directing said medium from the chamber to the structure, with a distal end of the annular sleeve being mounted in cooperating relationship with said inlet for occluding the same and stopping flow therethrough when the annular body is out of threading engagement with the structure opening, and with the distal end of the sleeve uncovering the inlet for permitting flow therethrough when the sleeve undergoes displacement by elongation of the annular body when the same is in threading engagement with the structure opening.

18. A device as in claim 17 in which the means forming the flow passage includes a cylindrical member mounted within the sleeve, and means forming at least one helical groove about the outer surface of the cylindrical member with the groove cooperating with the inner surface of the sleeve to define a helical flow passage.

19. A device as in claim 17 in which the means forming the flow passage includes an elongate member, and means forming at least one axially extending groove on the outer surface of the elongate member and with the groove cooperating with the inner surface of the sleeve to form an elongate flow passage.

20. A device as in claim 17 in which the means forming the flow passage includes an elongate member, and means forming at least one axially extending passage formed internally of the elongate member together with at least one generally radially extending passage which extends through the elongate member into said axially extending passage to define said inlet.

21. A device as in claim 17 which includes means forming an opening communicating with said reservoir, and said distal end of the inner sleeve is resiliently expandable radially with said distal end being positioned adjacent said opening means for establishing flow communication therewith for filling of the reservoir when the distal end is expanded radially by the pressure of medium within the sleeve.

22. In a device for metering a flow of viscous medium into a structure, the combination of a fitting mountable into said structure, means carried by the fitting for forming an annular chamber, means forming a passage through said fitting for directing medium from the annular chamber to the structure, a first member having an annular rim which extends about the longitudinal axis of the device, a second member mounted between the first member and said annular chamber with an annular portion of the second member being juxtaposed with said rim, means associated with said first member for forming a reservoir for containing said medium, means forming an annular channel in either of said first or second members with the channel extending through an arc about said longitudinal axis, a first opening formed in the first member for directing medium from the reservoir to the channel and into a second opening formed in the second member for directing medium from the channel into said annular chamber and thereafter into said passage in the fitting, including means for mounting said first member and said reservoir for rotation with respect to said second member about the longitudinal axis for selectively varying the circular distance between the first and second openings whereby the length of the channel through which the medium flows is selectively varied for adjusting the rate of flow of the medium into the structure.

23. A device as in claim 22 in which the second member is formed of an elastomeric material with an annular portion of the second member being elastically stretched across the rim of the first member for fluidly sealing the inner and outer edges of the rim, and said channel comprises a groove formed in the first member with said groove being concave with respect to the second member for defining a flow passage therewith.

24. A device as in claim 22 in which the inner circular portion of said second member cooperates with said first member to define a central chamber, means is formed in the second member for directing the medium between the annular chamber and the central chamber, and means is formed in the second member for directing the medium between said central chamber and said passage means formed in the fitting.

25. In a device for metering the flow of a viscous medium into a structure having an opening formed with internal threads of a given pitch, the combination of means forming a chamber containing a charge of said medium under pressure, means forming an elongate flow passage for metering the medium at a controlled rate from the chamber into the structure, the flow passage means including a first member having an inlet opening communicating with the medium within the chamber, a second member having an outlet opening for directing the medium along a discharge path to said opening of the structure, means forming a channel in either of said first or second member, said channel extending along a circular arc about said axis for establishing medium communication between said inlet and outlet openings, a fitting which is mounted with said first and second members, a flow control member carried by one end of the fitting, said control member being movable to open and close said discharge path, said fitting being formed with elastomeric external threads having a different pitch than said given pitch whereby threading engagement between the external and internal threads causes axial distortion of the external threads and movement of the control member to open said discharge path, with said control member closing said discharge path and occluding flow to the structure when the external and internal threads are out of engagement.

26. A device as in claim 25 which includes means for mounting the first member for rotation about said axis relative to the second member for selectively varying the separation distance along said channel between said inlet and outlet openings for controlling the rate of medium flow therethrough.

27. A devide as in claim 26 in which said channel is formed in the first member and extends about an arc of less than 360° whereby the opposite ends of the channel are separated by a flat portion, and said means mounting the first member for rotation selectively moves said flat portion into register with said outlet opening whereby medium flow therethrough is occluded.

28. In a device for metering a flow of viscous medium into a structure having internal threads of a given pitch, the combination of a housing, said housing including an elastomeric hollow cylindrical fitting which extends along a longitudinal axis of the device, said fitting being formed with external threads of a pitch which is less than said given pitch whereby interengagement of said threads causes axial elongation of the fitting, an annular sleeve carried within the fitting and mounted on an end thereof, means forming a reservoir for containing a charge of said medium under pressure, a first member formed with a circular channel having an inlet opening which is in fluid communication with said reservoir, a second member having an outlet opening in circular register with said channel, means for mounting said first and second members for selective relative movement about said axis whereby the circular distance between said inlet and outlet openings is varied for controlling the flow rate from the reservoir through the channel, and further for selectively moving said outlet opening out of register with said channel for occluding flow therethrough, and means for forming a discharge flow path between the outlet of said second member and said annular sleeve for directing medium from the device into the structure, with said annular sleeve being mounted to close the discharge flow path when the external threads are out of engagement with the internal threads, and whereby elongation of the fitting upon interengagement of said threads causes the sleeve to open the discharge flow path.

29. A device as in claim 28 in which said means for forming the discharge flow path includes a plug mounted within the housing, the plug having a shoulder which is mounted in relationship with the distal end of the sleeve whereby the sleeve is moved about the shoulder for closing said discharge flow path, and said sleeve is displaced away from the shoulder for opening said discharge flow path when the fitting is elongated.

* * * * *